United States Patent [19]

Bloomberg

[11] Patent Number: 5,202,933
[45] Date of Patent: Apr. 13, 1993

[54] SEGMENTATION OF TEXT AND GRAPHICS

[75] Inventor: Dan S. Bloomberg, Palo Alto, Calif.

[73] Assignee: Xerox Corporation, Rochester, N.Y.

[21] Appl. No.: 449,626

[22] Filed: Dec. 8, 1989

[51] Int. Cl.⁵ .............................................. G06K 9/46
[52] U.S. Cl. ............................................ 382/9; 382/27;
382/55; 382/33; 358/462
[58] Field of Search ................... 382/48, 22, 55, 49,
382/9, 33, 27; 358/456, 462

[56] References Cited

U.S. PATENT DOCUMENTS

| | | |
|---|---|---|
| 4,196,453 | 4/1980 | Warren . |
| 4,411,015 | 10/1983 | Scherl et al. ........................ 382/51 |
| 4,414,685 | 11/1983 | Sternberg ........................... 382/49 |
| 4,503,556 | 3/1985 | Scherl et al. ........................ 382/9 |
| 4,504,972 | 3/1985 | Scherl et al. ........................ 382/51 |
| 4,513,442 | 4/1985 | Scherl ............................... 382/49 |
| 4,577,235 | 3/1986 | Kannapell et al. . |
| 4,644,392 | 2/1987 | Yamada .............................. 358/75 |
| 4,700,400 | 10/1987 | Ross ................................. 382/27 |
| 4,724,488 | 2/1988 | Van Daele et al. . |
| 4,742,558 | 5/1988 | Ishibashi et al. ..................... 382/56 |
| 4,750,209 | 6/1988 | Shimura et al. ..................... 382/9 |
| 4,786,976 | 11/1988 | Takao et al. . |
| 4,791,679 | 12/1988 | Barski et al. ........................ 382/55 |
| 4,805,031 | 2/1989 | Powell . |
| 4,817,186 | 3/1989 | Goolsbey et al. .................... 382/9 |
| 4,821,333 | 4/1989 | Gillies .............................. 382/49 |
| 4,823,194 | 4/1989 | Mishima et al. . |
| 4,827,330 | 5/1989 | Walsh et al. . |
| 4,827,529 | 5/1989 | Peppers et al. ...................... 382/9 |
| 4,837,847 | 6/1989 | Shirasaka et al. .................... 382/55 |
| 4,858,018 | 8/1989 | Tanaka ............................. 358/456 |

FOREIGN PATENT DOCUMENTS

| | | |
|---|---|---|
| 0287995 | 10/1988 | European Pat. Off. . |
| 0288266 | 10/1988 | European Pat. Off. . |
| 0308673 | 3/1989 | European Pat. Off. . |
| 61-225974 | 10/1986 | Japan . |

OTHER PUBLICATIONS

Wong et al., "Document Analysis System," *IBM J. Res. Development* (1982) 26:647–656.

Sternberg, "Biomedical Image Processing," *IEEE* (1983) pp. 22–34.

Maragos, "Tutorial on Advances in Morphological Image Processing and Analysis," *Optical Engineering* (1987) 26:623–632.

Haralick et al., "Image Analysis Using Mathematical Morphology," *IEEE*, vol. PAMI-9, No. 4, Jul. 1987, pp. 532–550.

*Primary Examiner*—Michael T. Razavi
*Assistant Examiner*—Yon Jung
*Attorney, Agent, or Firm*—Townsend and Townsend

[57] ABSTRACT

A method and apparatus for differentiating and extracting text and line graphics in an image. The method provides for the use of morphological operations, preferably at reduced scale, to eliminate vertical rules and lines from an image followed by the elimination of horizontal rules and lines, remaining text regions are then solidified to produce a separation mask. The mask is used in conjunction with the original image to produce separate text and graphics images.

79 Claims, 13 Drawing Sheets

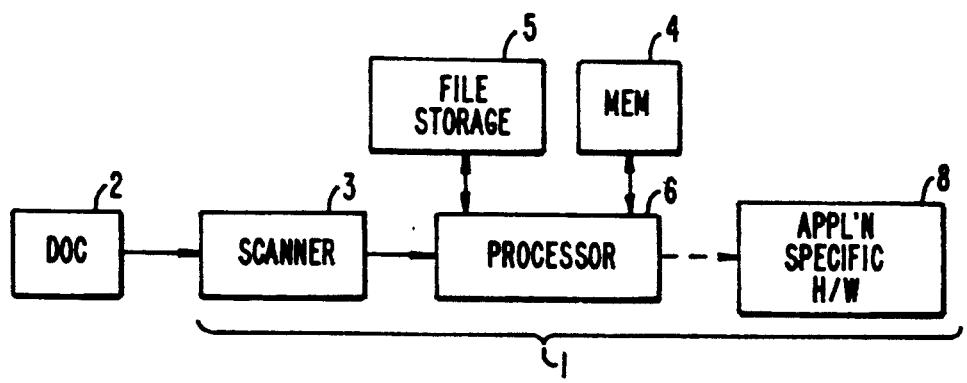
FIG._1A.
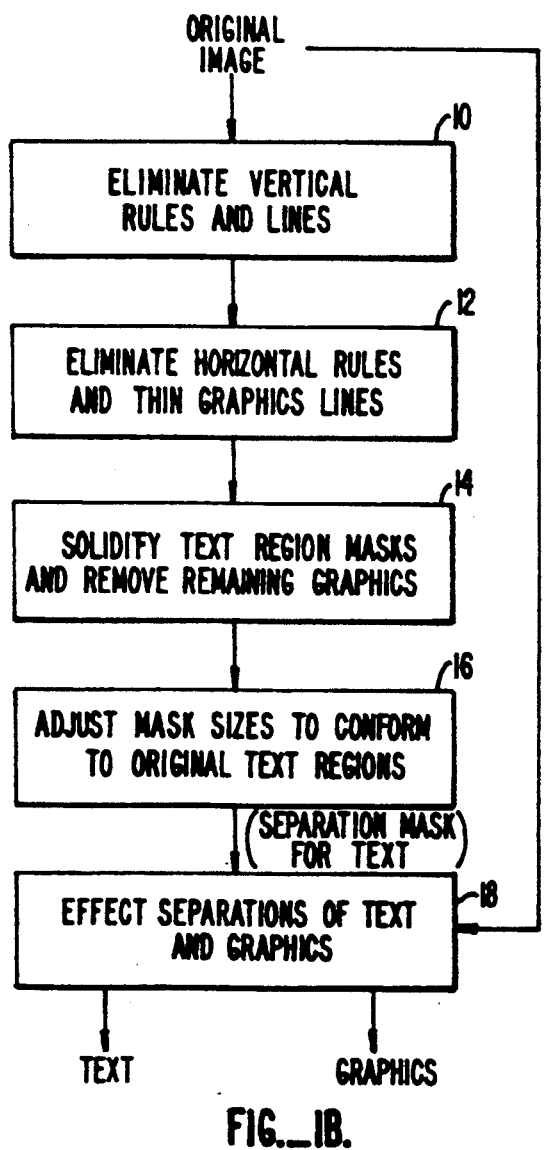
FIG._1B.

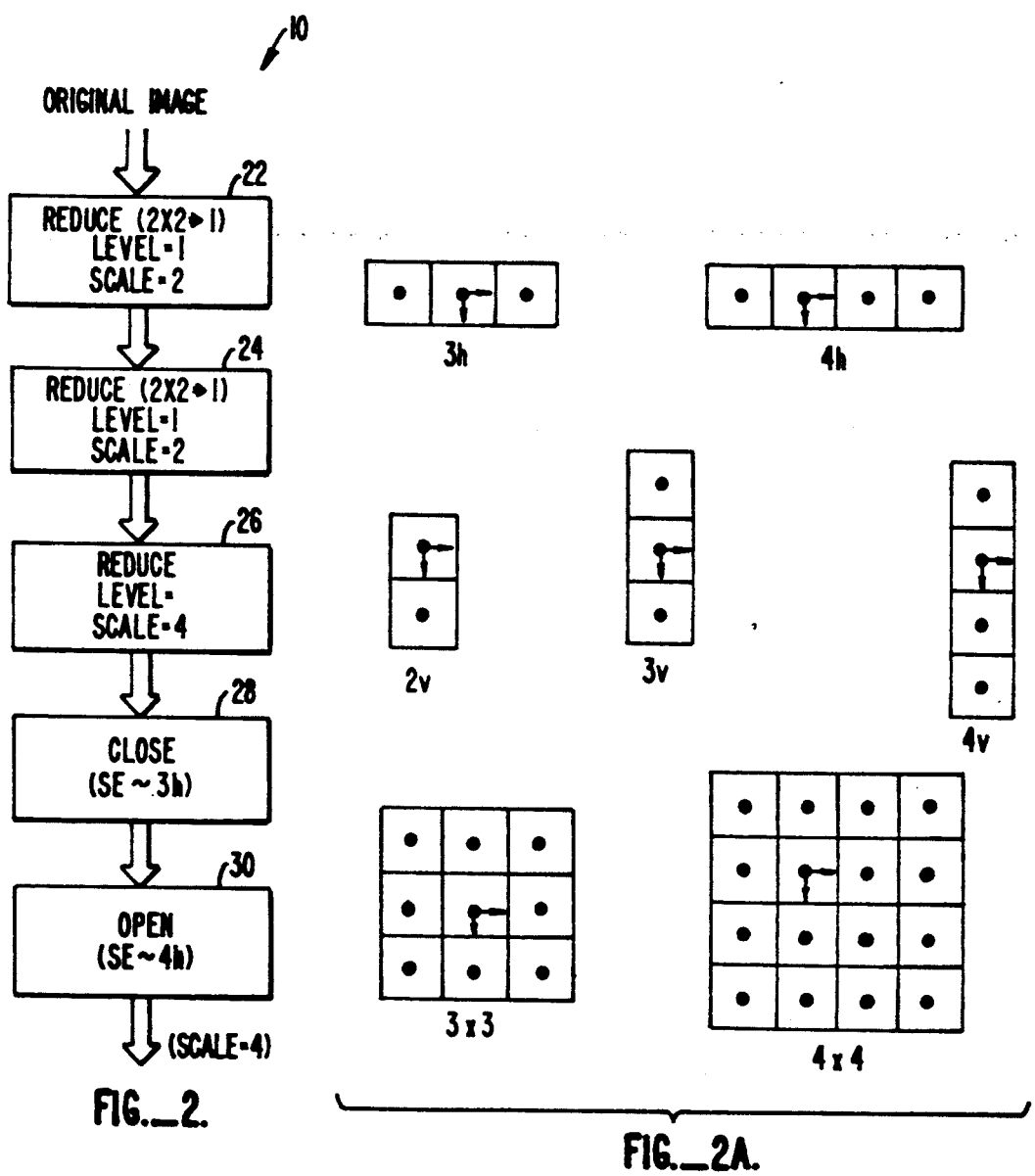
FIG._2.
FIG._2A.

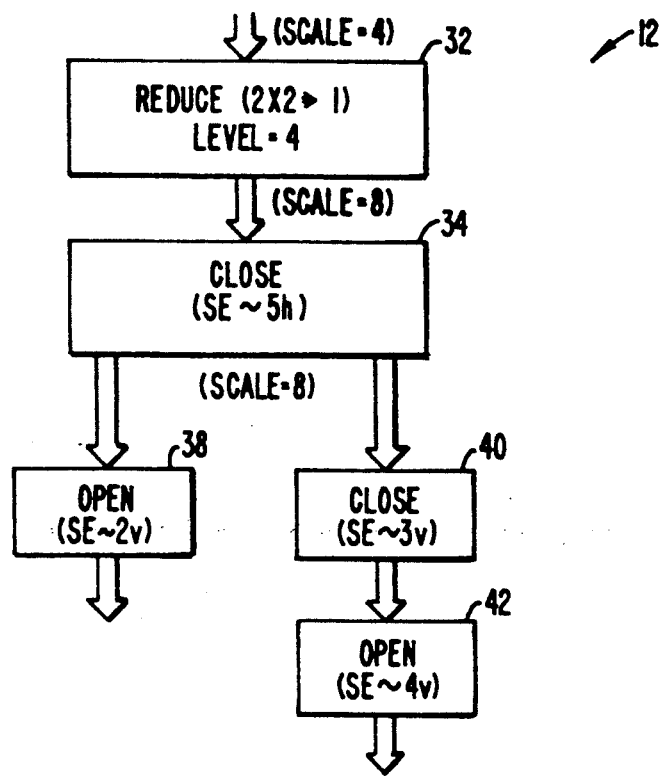
FIG._3.
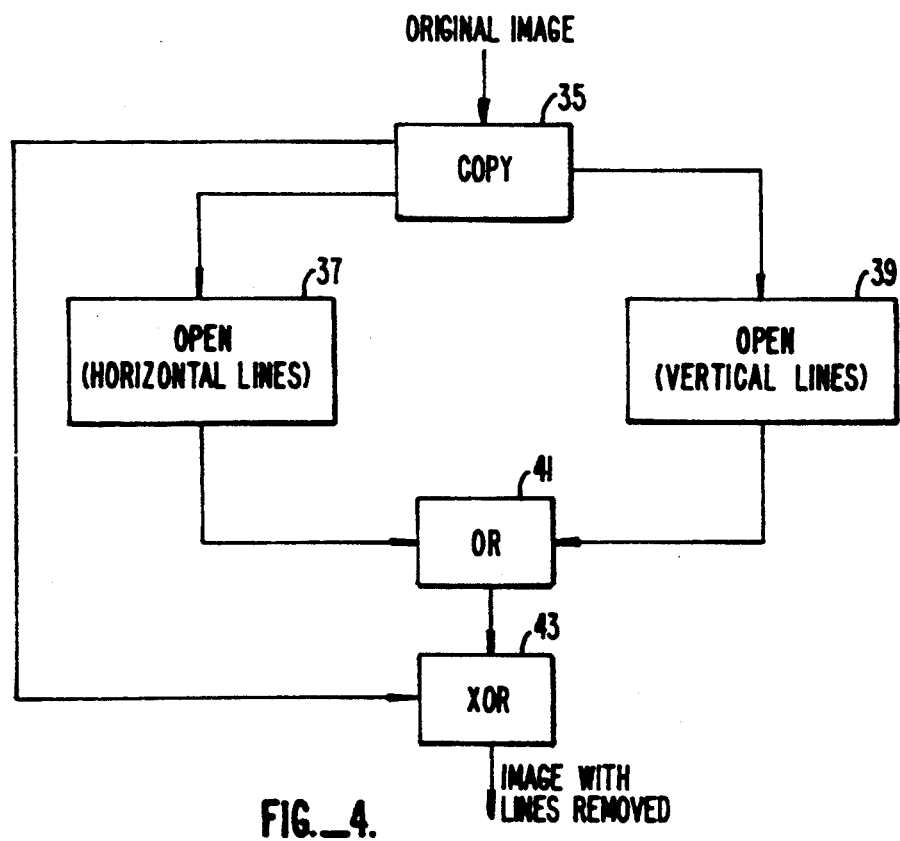
FIG._4.

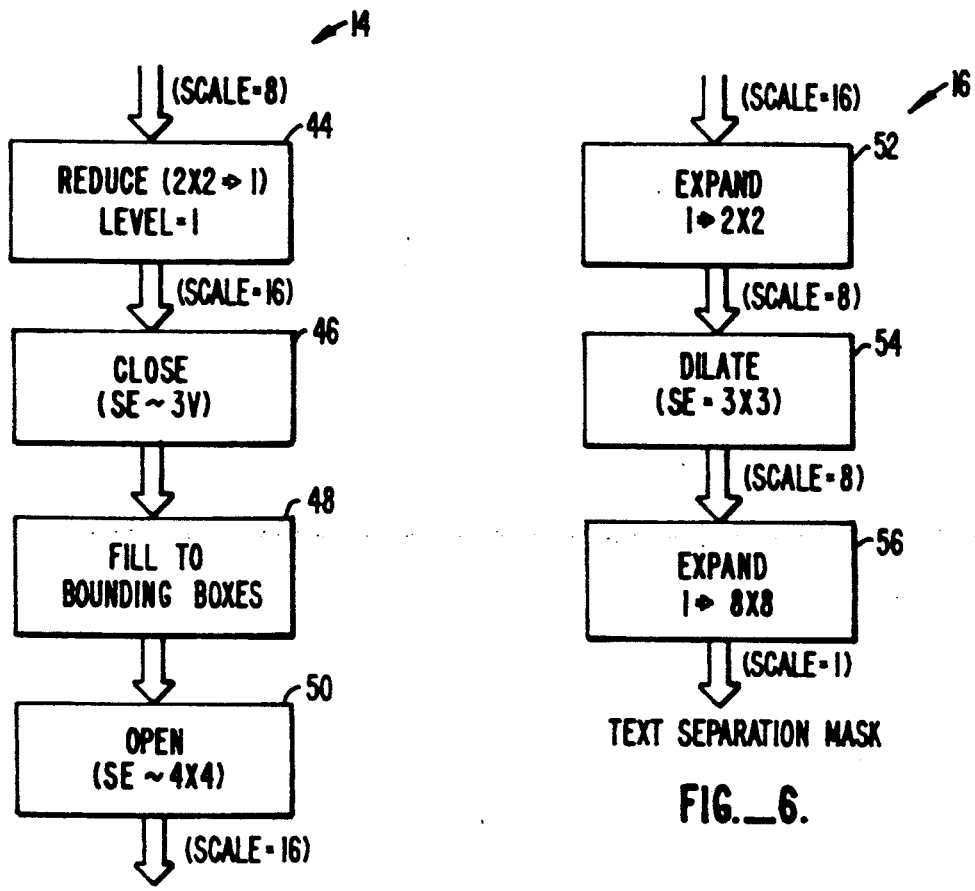
FIG._5.
FIG._6.
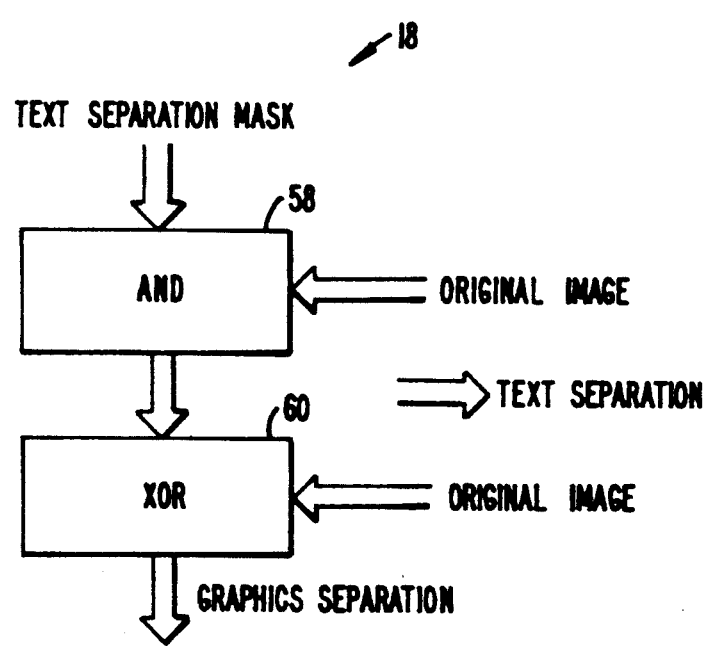
FIG._7.

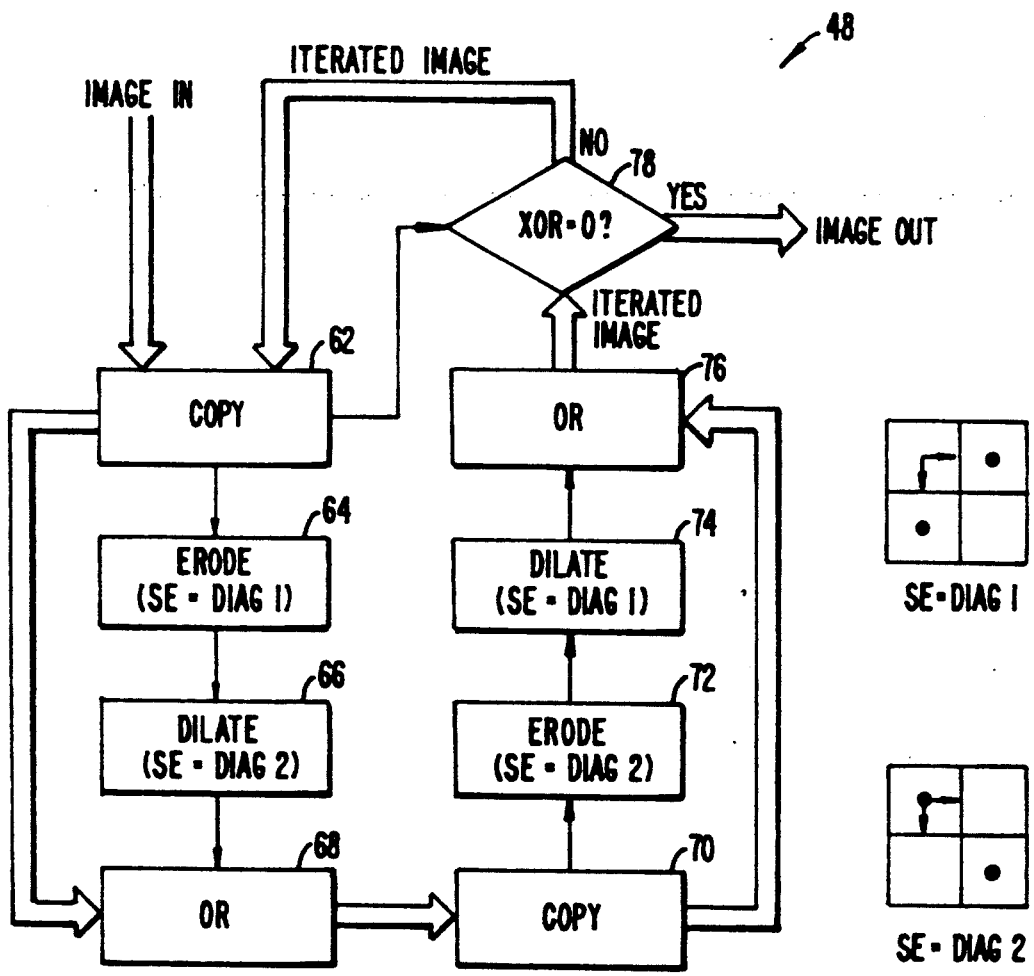
FIG._8.

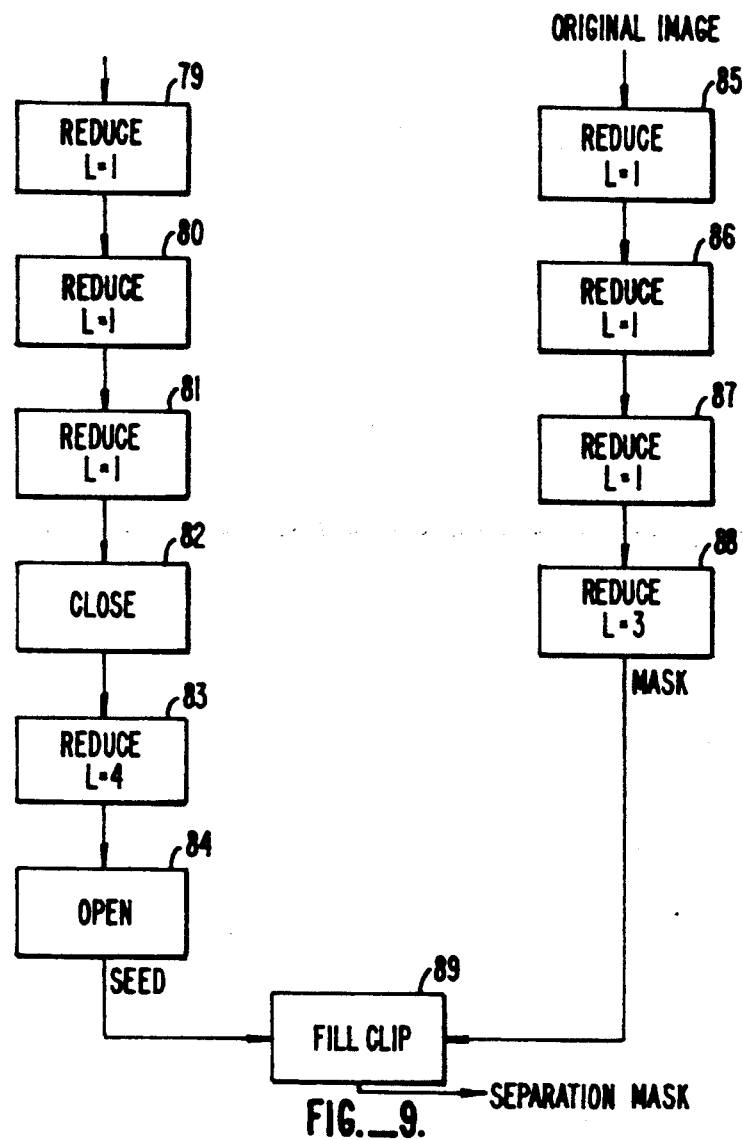
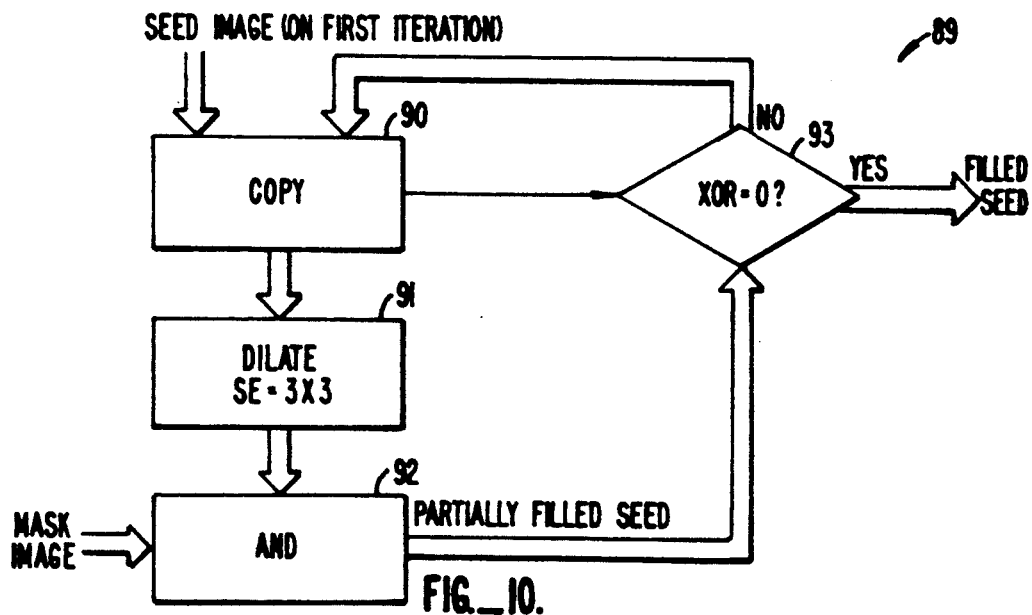

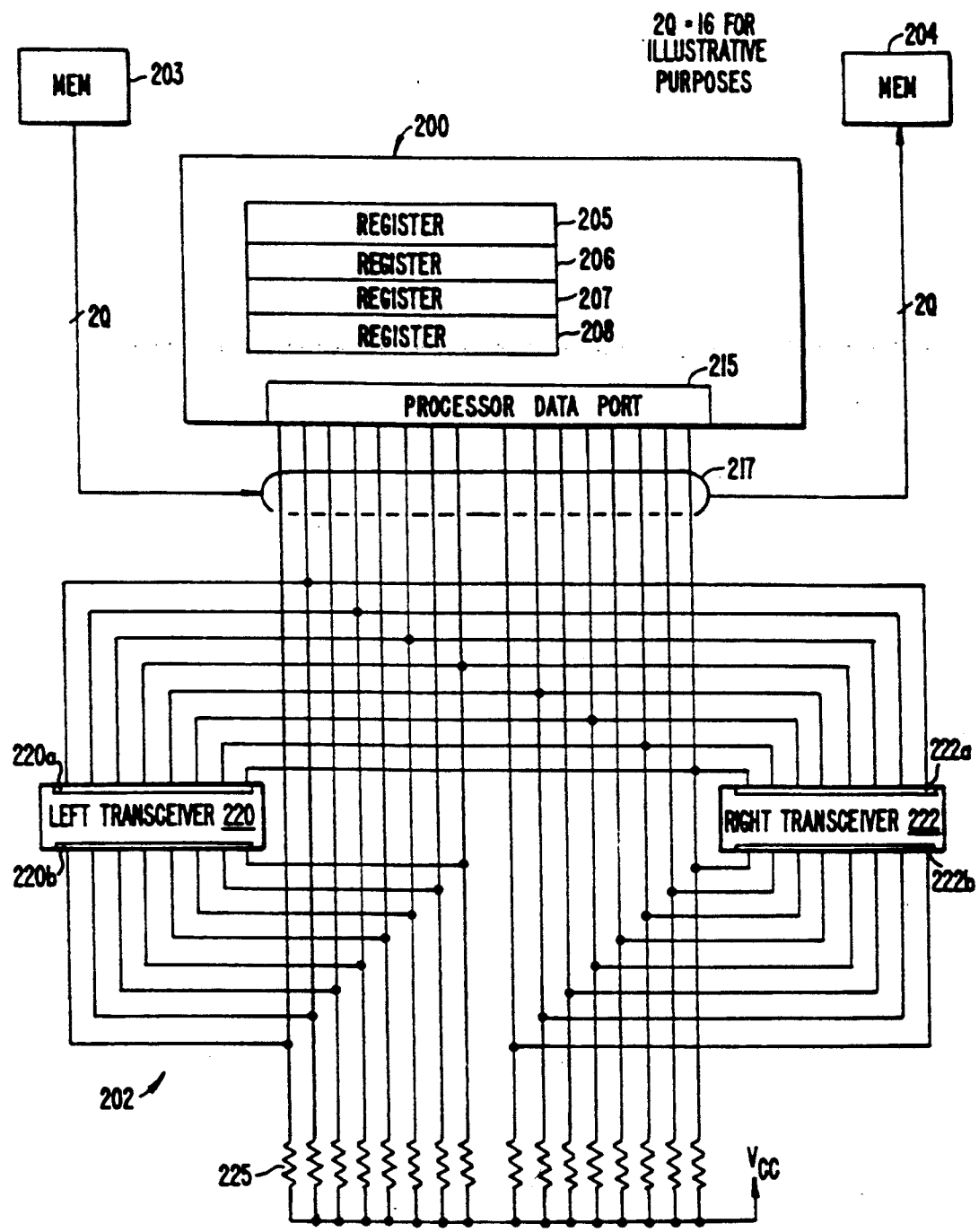
FIG._11.

Cela est d'autant plus valable que $T\Delta f$ est plus grand. A cet égard la figure 2 représente la vraie courbe donnant $|\phi(f)|$ en fonction de $f$ pour les valeurs numériques indiquées page précédente.

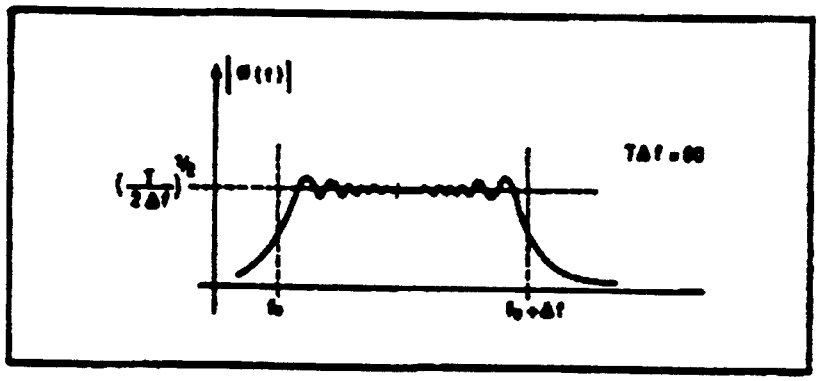

FIG. 2

Dans ce cas, le filtre adapté pourra être constitué, conformément à la figure 3, par la cascade :

— d'un filtre passe-bande de transfert unité pour $f_0 \leq f \leq f_0 + \Delta f$ et de transfert quasi nul pour $f < f_0$ et $f > f_0 + \Delta f$, filtre ne modifiant pas la phase

FIG._12A.

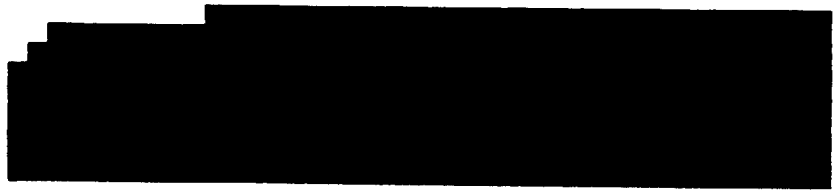
FIG._12B.

Cela est d'autant plus valable que $T\Delta f$ est plus grand. A cet égard la figure 2 représente la vraie courbe donnant $|\phi(f)|$ en fonction de $f$ pour les valeurs numériques indiquées page précédente.

Dans ce cas, le filtre adapté pourra être constitué, conformément à la figure 3, par la cascade :

— d'un filtre passe-bande de transfert unité pour $f_0 \leq f \leq f_0 + \Delta f$ et de transfert quasi nul pour $f < f_0$ et $f > f_0 + \Delta f$, filtre ne modifiant pas la phase

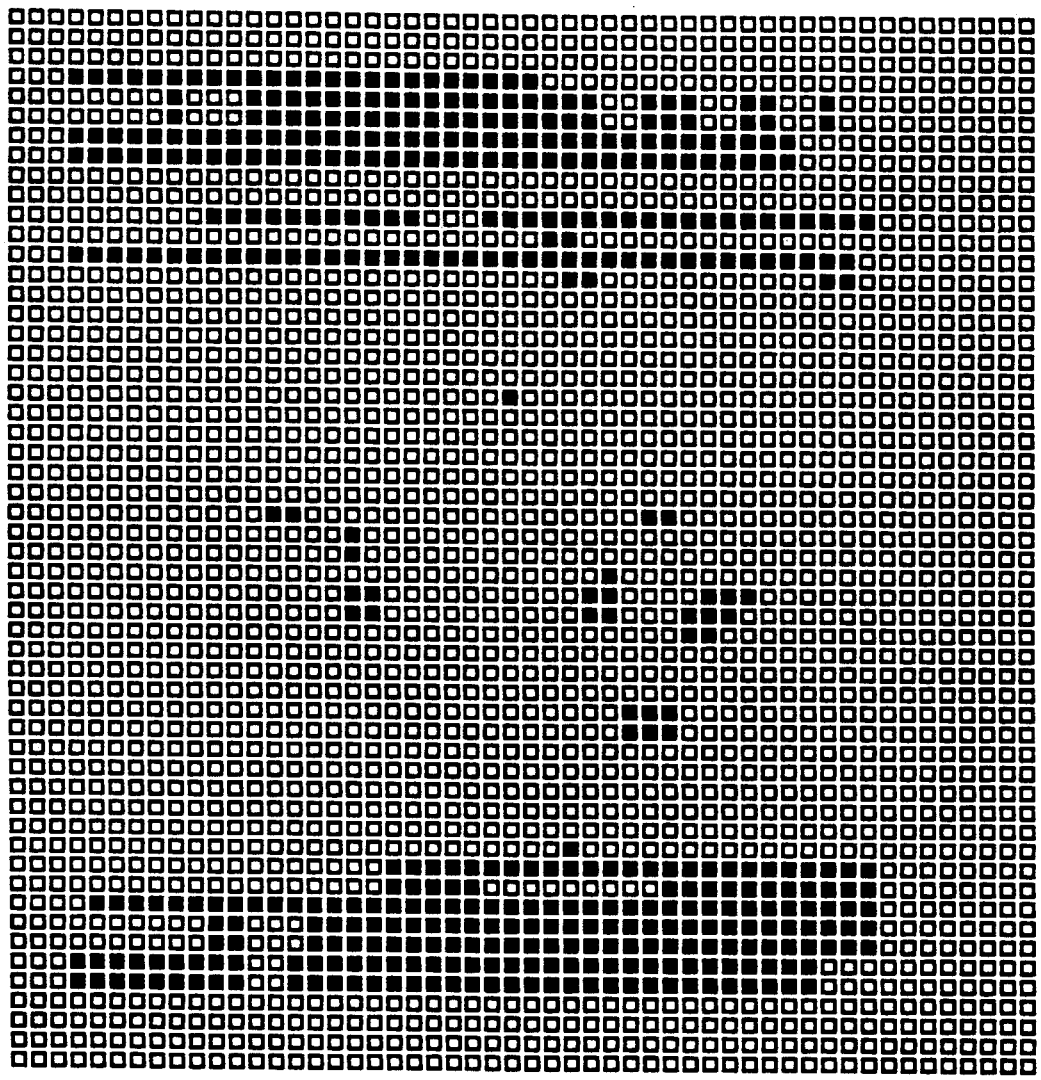
FIG._13A.

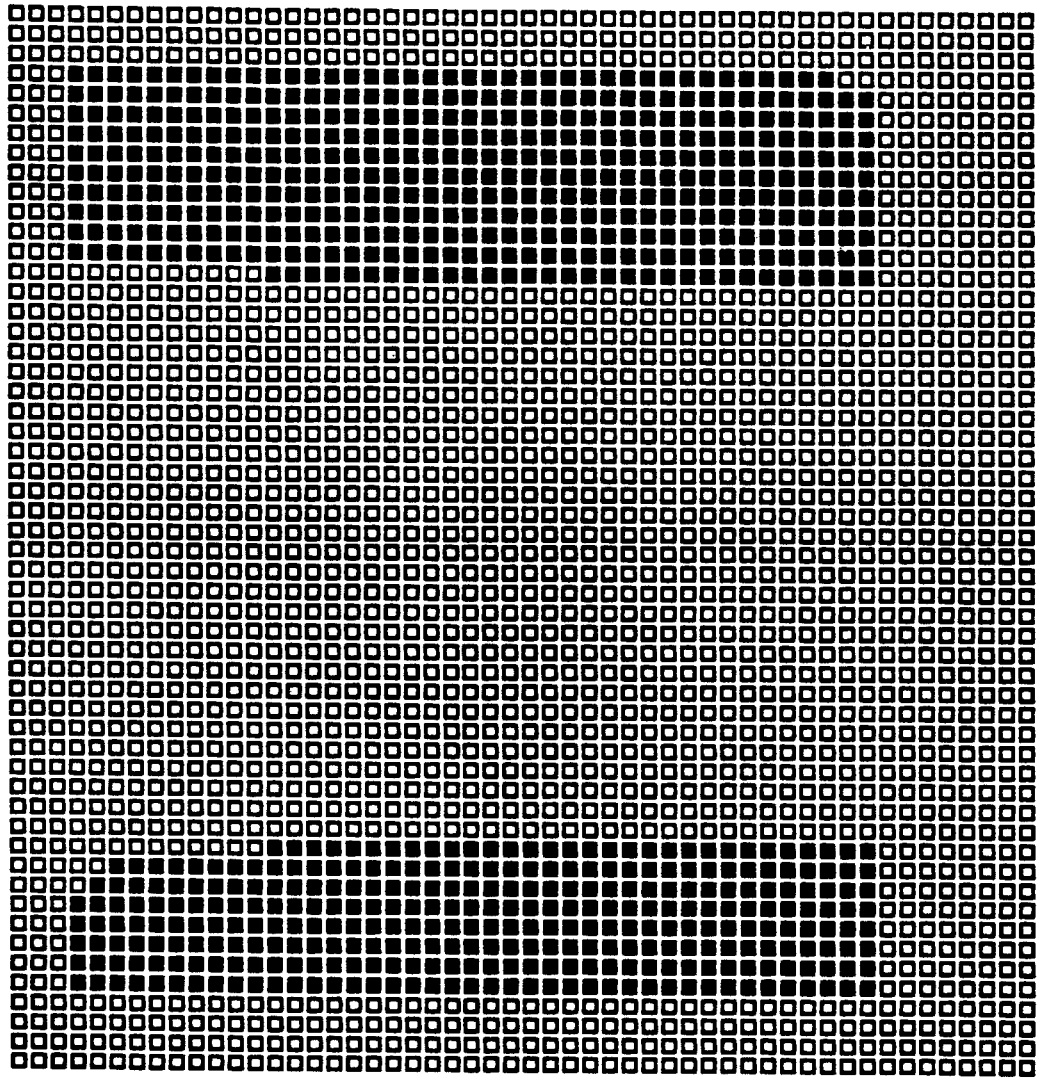
FIG._13B.

SEGMENTATION OF TEXT AND GRAPHICS

MICROFICHE APPENDIX

This specification includes microfiche Appendix 1 having 2 sheets with 159 frames.

BACKGROUND OF THE INVENTION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to the field of image processing. More specifically, in one embodiment the invention provides a method and apparatus for identifying and/or separating text and graphics in an image.

Many documents and their images contain both text and graphics. These documents range from relatively simple documents with text interspersed by horizontal and vertical lines (e.g., forms and organization charts) to relatively complicated documents such as engineering drawings, which may have line graphics oriented at a variety of angles interspersed with text oriented at various angles.

The ability to identify and/or separate text and line graphics in a document and its image is important in a wide variety of applications. For example, text recognizers (otherwise referred to as optical character recognition or OCR systems) generally perform poorly when graphics are included in an image of a document. Therefore, it would be desirable to remove graphics from an image before forwarding the image to an OCR system. Conversely, for purposes of a compact and accurate representation, it is also important to send only graphics regions to graphics recognizers.

While meeting with some success, prior art methods of separating text and graphics have met with a variety of limitations. Some of the prior methods require equipment which is expensive, complex, and/or unreliable, while other techniques require significant amounts of computer memory, computer time, or the like. Some of the methods are less than reliable in detecting and separating text and graphics. Accordingly, it is seen that an improved method and apparatus for separating text and graphics in a document or image is desired.

SUMMARY OF THE INVENTION

A method and apparatus for identifying text and graphics in a document or its image is disclosed. The method requires a relatively limited amount of computer memory and processing time, while providing reliable results and requiring relatively inexpensive hardware. The method and apparatus may be used, merely by way of example, to segment a binary image into text and graphics regions such that parts of the image may be sent to a text recognizer. Alternatively, the method and apparatus may be used to segment a binary image into text and graphics regions such that parts of the image may be sent to a graphics recognizer.

Accordingly, in one embodiment the invention comprises, in a digital processing system, a method of identifying a line graphics region in an image containing at least text and line graphics. The method includes the steps of converting OFF pixels adjacent to text pixels to ON pixels, at least a portion of said ON pixels connecting adjacent text pixels so as to produce coalesced regions of ON pixels; and identifying at least a portion of the image having the coalesced regions of ON pixels, at least a portion of a remainder of the image comprising the line graphics region.

In another embodiment the invention comprises, in a digital processing system, a method of identifying a text region in an image containing at least text and line graphics, comprising the steps of converting OFF pixels adjacent to text pixels to ON pixels, at least a portion of the ON pixels connecting adjacent text pixels so as to produce coalesced regions of ON pixels; and identifying at least a portion of the image having the coalesced regions of ON pixels, said at least a portion comprising said text region.

A further understanding of the nature and advantages of the inventions herein may be realized by reference to the remaining portions of the specification and the attached drawings.

BRIEF DESCRIPTION OF THE DRAWINGS

FIGS. 1A and 1B are overall block diagrams illustrating the hardware to which the invention may be applied and operation of the invention in the hardware respectively;

FIG. 2A illustrates the 3h and 4h SEs used for purposes of illustration in FIG. 2, as well as other SEs used herein;

FIG. 3 is a detailed block diagram illustrating a reduction as a method for eliminating horizontal lines as shown in FIG. 1B;

FIG. 4 illustrates an alternative method for eliminating horizontal and vertical lines;

FIG. 5 is a detailed block diagram illustrating a procedure for a reduction with solidification of text regions and removal of remaining graphics, as shown in FIG. 1B;

FIG. 6 is a detailed block diagram illustrating details of adjusting mask size to conform to original text regions;

FIG. 7 is a detailed block diagram illustrating a method for separating text and graphics;

FIG. 8 illustrates a method of filling 8-connected regions in a mask to the smallest enclosing rectangular bounding boxes. Double arrows show the flow of the primary image and single arrows show intermediate computations;

FIG. 9 illustrates a method of producing a mask from a text seed;

FIG. 10 illustrates a FILLCLIP operation;

FIG. 11 illustrates special purpose hardware for implementation of the ,reduction techniques herein;

FIGS. 12A to 12D illustrate operation of one embodiment of the invention; and

FIGS. 13A and 13B illustrate operation of a second embodiment of the invention.

DESCRIPTION OF THE PREFERRED EMBODIMENTS

CONTENTS

Figure 2:
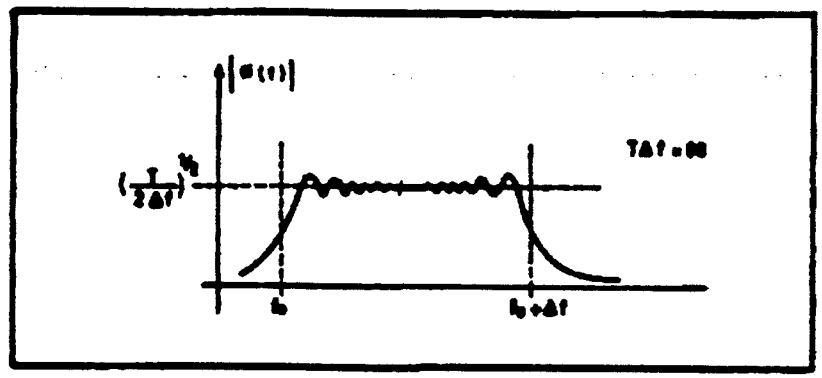
FIG. 2 is a detailed block diagram illustrating a reduction and method for eliminating vertical lines as shown in FIG. 1B.

A. Definitions and Terminology
B. Overall Description of the Invention

C. Details of the Invention
D. Illustrative Alternative Embodiment of the Invention
E. Fast Thresholded Reduction (and Expansion) of Images
F. Discussion of the Software
G. Graphical Illustration of the Invention
H. Conclusion

A. Definitions and Terminology

The present discussion deals with binary images. In this context, the term "image" refers to a representation of a two-dimensional data structure composed of pixels. A binary image is an image where a given pixel is either "ON" or "OFF." Binary images are manipulated according to a number of operations wherein one or more source images are mapped onto a destination image. The results of such operations are generally referred to as images. The image that is the starting point for processing will sometimes be referred to as the original image. Pixels are defined to be ON if they are black and OFF if they are white. It should be noted that the designation of black as ON and white as OFF reflects the fact that most documents of interest have a black foreground and a white background. While the techniques of the present invention could be applied to negative images as well, the discussion will be in terms of black on white. In some cases the discussion makes reference to a "don't care" pixel which may be either an ON or an OFF pixel. 1 A "solid region" of an image refers to a region extending many pixels in both dimensions within which substantially all the pixels are ON. A "textured region" of an image refers to a region that contains a relatively fine-grained pattern. Examples of textured regions are halftone or stippled regions. AND, OR, and XOR are logical operations carried out between two images on a pixel-by-pixel basis. NOT is a logical operation carried out on a single image on a pixel-by-pixel basis. "Expansion" is a scale operation characterized by a SCALE factor N, wherein each pixel in a source image becomes an N×N square of pixels, all having the same value as the original pixel. "Reduction" is a scale operation characterized by a SCALE factor N and a threshold LEVEL M. Reduction with SCALE=N entails dividing the source image into N×N squares of pixels, mapping each such square in the source image to a single pixel on the destination image. The value for the pixel in the destination image is determined by the threshold LEVEL M, which is a number between 1 and $N^2$. If the number of ON pixels in the pixel square is greater or equal to M, the destination pixel is ON, otherwise it is OFF.

"Subsampling" is an operation wherein the source image is subdivided into smaller (typically square) elements, and each element in the source image is mapped to a smaller element in the destination image. The pixel values for each destination image element are defined by a selected subset of the pixels in the source image element. Typically, subsampling entails mapping to single pixels, with the destination pixel value being the same as a selected pixel from the source image element. The selection may be predetermined (e.g. upper left pixel) or random.

A "4-connected region" is a set of ON pixels wherein each pixel in the set is laterally or vertically adjacent to at least one other pixel in the set.

An "8-connected region" is a set of ON pixels wherein each pixel in the set is laterally, vertically, or diagonally adjacent to at least one other pixel in the set.

"Text" refers to portions of a document or image which contains letters, numbers, or other characters including non-alphabetic linguistic characters such as ideograms and syllabry.

"Line graphics" refers to portions of a document or image composed of graphs, figures, or drawings other than text, generally composed of horizontal, vertical, and skewed lines having a Graphics could range from, for example, horizontal and vertical lines in an organization chart to more complicated horizontal, vertical, and skewed lines in, for example, engineering drawings.

A "line-adjacency graph" (LAG) is a data structure representing a binary image which has a tree form with generally three levels in the hierarchy. The three levels are (i) runs of adjacent ON pixels in a scanline, (ii) strokes composed of connected runs, and (iii) the isolated marks (e.g., letters) composed of connected strokes.

A number of morphological operations map a source image onto an equally sized destination image according to a rule defined by a pixel pattern called a structuring element (SE). The SE is defined by a center location and a number of pixel locations, each having a defined value (ON or OFF). The pixels defining the SE do not have to be adjacent each other. The center location need not be at the geometrical center of the pattern; indeed it need not even be inside the pattern.

A "solid" SE refers to an SE having a periphery within which all pixels are ON. For example, a solid 2×2 SE is a 2×2 square of ON pixels. A solid SE need not be rectangular.

A "hit-miss" SE refers to an SE that specifies at least one ON pixel and at least one OFF pixel.

"Erosion" is a morphological operation wherein a given pixel in the destination image is turned ON if and only if the result of superimposing the SE center on the corresponding pixel location in the source image results in a match between all ON and OFF pixels in the SE and the underlying pixels in the source image.

"Dilation" is a morphological operation wherein a given pixel in the source image being ON causes the SE to be written into the destination image with the SE center at the corresponding location in the destination image. The SEs used for dilation typically have no OFF pixels.

"Opening" is a morphological operation that consists of an erosion followed by a dilation. The result is to replicate the SE in the destination image for each match in the source image.

"Closing" is a morphological operation consisting of a dilation followed by an erosion.

"Fill8" refers to an image operation in which -connected regions are filled to rectangular bounding boxes.

A "mask" refers to an image, normally derived from an original image, that contains substantially solid regions of ON pixels corresponding to regions of interest in the original image. The mask may also contain regions of ON pixels that do not correspond to regions of interest.

The various operations defined above are sometimes referred to in noun, adjective, and verb forms. For example, references to dilation (noun form) may be in terms of dilating the image or the image being dilated (verb forms) or the image being subjected to a dilation operation (adjective form). No difference in meaning is intended.

B. Overall Description of the Invention

A wide variety of documents contain both text and line graphics. Such documents range from very simple documents (e.g., forms and organization charts) to relatively complex documents (e.g., engineering drawings and the like) in which a variety of types and angles of line graphics may be interspersed with a variety of types of text.

The present invention provides a morphological method and apparatus for identification of text and line graphics in an image and, optionally, segmentation of images of such images into text and graphics. The method is effective, relatively fast, and relatively efficient computationally. The technique generally operates by formation of a mask which identifies text and graphics regions that may exist in an image, followed by separation of the text and graphics portions of the image. The technique enhances textural and other differences in an image and is relatively insensitive to skew, closeness of lines of text, and the like.

The invention will find a wide variety of applications in which it is desired to separate text and graphics in an image. Merely by way of example, the invention may be used in conjunction with text recognizers which normally perform poorly when graphics are interspersed in an image. The invention would be used in conjunction with such text recognizers by eliminating graphics from an image before processing in the text recognizer. Conversely, graphics recognizers operate very inefficiently when presented with text. The invention herein would be used in conjunction with such graphics recognizers by removing text before processing. Still alternatively the invention could be used in an electroreprographic system to print text separately from graphics with different copy parameters including, for example, different colors. Of course these applications are merely illustrative of special purpose hardware to which the invention may be applied.

FIG. IA is a block diagram of an image analysis system 1 within which the present invention may be embodied. The basic operation of system 1 is to extract or eliminate certain characteristic portions of a document 2. To this end, the system includes a scanner 3 which digitizes the document on a pixel basis, and provides a resultant data structure. Depending on the application, the scanner may provide a binary image (a single bit per pixel) or a gray scale image (a plurality of bits per pixel). This data structure contains the raw content of the document, to the precision of the resolution of the scanner. This data structure, typically referred to as an image, may be sent to a memory 4 or stored as a file in a file storage unit 5, which may be a disk or other mass storage device.

A processor 6 controls the data flow and performs the image processing. Processor 6 may be a general purpose computer, a special purpose computer optimized for image processing operations, or a combination of a general purpose computer and auxiliary special purpose hardware. If a file storage unit is used, the image is transferred to memory 4 prior to processing. Memory 4 may also be used to store intermediate data structures and possibly a final processed data structure.

The result of the image processing, of which the present invention forms a part, can be a derived image, numerical data (such as coordinates of salient features of the image) or a combination. This information may be communicated to application specific hardware 8, which may be a printer, display, optical character recognition system, graphics recognizer, electroreprographic copier, or the like, or may be written back to file storage unit 5.

The invention utilizes specialized reduction procedures and morphological operations to transform regions according to their texture in such a way as to remove line graphics while altering the texture of pixels in text regions so that the text regions continue to be retained and, ultimately, coalesced into a separation mask of solid or nearly solid ON pixels. Thus, line graphics pixels are removed, while retaining text pixels as a solid block(s) of coalesced ON pixels.

In preferred embodiments large solid ON regions of an image (i.e., regions having run lengths of ON pixels over a substantially greater distance than the text or graphics in the image) and finely textured regions (such as half tones or stipples) are first removed from the image. A variety of methods are available for removal of such regions, but in preferred embodiments such regions are removed according to one of the methods disclosed in U.S. Pat. Nos. 5,065,437 and 5,131,049 which are assigned to the assignee of the present invention and incorporated herein by reference for all purposes. The remaining image contains primarily or exclusively text and line graphics. Of course such removal step is optional, particularly when images to be processed are not expected to contain solid black, stippled, or finely textured regions.

FIG. 1B is an overall flow diagram illustrating one embodiment of the invention as it is used to process an input binary image, which has preferably had finely textured regions removed according to the above methods. The particular textural properties of text, which are used here, are (1) that pixels for horizontal text tend to be relatively closely spaced on a scanline, (2) the text tends to have an appreciable height (say, 10 or more pixels high), and (3) the text tends to come in text lines whose centers are separated by a specific distance that is not known a priori, but which is not more than a fixed amount which may be, for example, about three times the height of the characters.

Vertical runs in the graphical portion of the image (otherwise referred to as vertical runs), some of which may be close to the text, are eliminated in step 10, and at he same time the text regions are solidified. This is accomplished in some embodiments by reduction with contrast enhancement, and the use of both the CLOSE and OPEN operations. With further reduction, using contrast weakening, and again preferably with both CLOSE and OPEN operations, the text lines are further delineated and at the same time horizontal rules and thin horizontal lines are removed in step 12. The image is again reduced, this time with contrast enhancement, and morphological operations such as CLOSE and FILL are used to solidify text regions into rectangular masks in step 14. A final optional small OPEN removes any remaining graphics regions. The remaining rectangular filled regions, representing the text area at high reduction, are then expanded at step 16 to original size, with some adjustment to compensate for slight size erosion during some of the reduction steps. The result is a text separation mask, from which the text and graphics separations of the original image may be separated at step 18.

The invention is illustrated herein primarily by way of reduced scale operations since reduced scale operations operate in an efficient manner. Of course, the invention need not be operated at reduced scale but could instead be conducted entirely at full scale.

C. Details of the Invention

FIG. 2 shows the details of one embodiment of step 10 in FIG. 1B. The image is reduced in steps 22 and 24 by a factor of two, (SCALE=2) using a threshold LEVEL=1 (i.e., if any of four pixels is ON, the reduced pixel in the destination image is ON). The image is now reduced at step 26 to SCALE=4 (a linear SCALE factor of 4).

This is followed by a CLOSE at step 28 with a small horizontal SE (e.g., 3h), to tie characters together within each word. This is in preparation for step 30, which is an OPEN with a slightly larger horizontal SE (e.g., 4h), which removes all vertical rules and graphics. Because the characters were tied together somewhat by the CLOSE of step 28, they are not greatly eroded by the OPEN of step 30. FIG. 2A illustrates 3h and 4h SEs, along with other SEs used herein for illustration. Arrows indicate the origin or reference point of the SE, although most of the operations used herein are independent of the origin of the SE.

There are two advantages of using a thresholded reduction operator rather than a series of CLOSE and OPEN operations to perform these texture enhancements and differentiations. The first is that operations at reduced scale are much faster computationally than those at full scale. Operation time generally varies inversely with about the third power of the linear reduction factor. Thus, for example, by REDUCING with a threshold LEVEL=1, it is possible to simultaneously close the texture and make an image at reduced scale, for which all subsequent operations will go much faster. The second reason is more subtle. Because the size of the text is not known a priori, it is not known how large the SE should be in a CLOSE. If an SE is chosen that is too small to bridge adjacent parts within the texture region, then the CLOSE operation fails to make those bridges, and no change is made to the image. Thus, using a CLOSE is locally all-or-nothing. On the other hand, the REDUCE with LEVEL=1 invariably results in a darkening of the texture and, therefore, a more effective CLOSE.

FIG. 3 shows the details of step 12 of FIG. 1B. The objective is to further solidify the pixels corresponding to textlines, so that some of them will survive the operation that removes horizontal graphics. This is accomplished by performing a further REDUCTION at step 32 to SCALE=8, using a threshold LEVEL=4, to weaken the graphics. This reduction also has the effect of weakening the text lines, so they are strengthened by a CLOSE at step 34 with a relatively large horizontal SE (e.g., 5h, or a larger horizontal SE).

The horizontal line graphics can be removed in two different ways. The image may be OPENed as in step 38 with a small vertical SE (e.g., 2v), which will remove the thinner of the horizontal lines. Alternatively, by making use of the adjacency of text lines, the thicker line graphics may be removed by using a combination of a CLOSE, as shown in step 40, with a larger vertical SE (e.g., at least a 3v), followed by a vertical OPEN, as shown in step 42, with an even larger SE (e.g, at least a 4v). The result of the first vertical CLOSE is to tie some of the text lines together. The following vertical OPEN will remove many of the pixels in the text region, but none where they have been tied by the previous vertical CLOSE.

FIG. 4 illustrates a method which may be used to eliminate p horizontal and vertical lines from an image in place of steps 10 and 12 or which may be used to process the image before steps 10 and 12. This method is more robust (i.e., can accurately process a wider variety of images) when handling, for example, columns of text separated by a narrow margin of white space containing a vertical rule. The proximity of the vertical rule to the text columns makes separation difficult if the vertical rule is not removed first.

To remove vertical and horizontal lines, the image is OPENed successively with horizontal an vertical SEs, and the union of the two OPENed images (which constitutes the horizontal and vertical lines) is removed from the original by XORing. The SEs must represent lines that are longer than those found in the text regions, so as not to remove any of the text. This pre-processing is shown schematically in FIG. 4. Specifically, the original image is copied at step 35 for later use. The copied image is both OPENed at step 37 and CLOSED at step 39 using horizontal and vertical SEs, respectively, having more than 2 ON pixels. At step 41 the OPENed images from steps 37 and 39 are ORed and the ORed image from step 41 is XORed with the original image at step 43. The result is an image with most or all horizontal and vertical lines removed.

The horizontal and vertical lines, along with most of the graphics have now been removed, and the text regions have the texture of closely spaced horizontal lines with some bridging. FIG. 5 shows the details of step 14 of FIG. 1B, in which the text regions are filled into rectangular regions, and the remaining pixels in graphics regions are removed. The image is reduced a fourth time, at step 44 to SCALE=16, with high contrast LEVEL=1. A CLOSE with a vertical SE (e.g., 3v) at step 46 further joins adjacent lines, and the marks in the image are then optionally filled to enclosing bounding boxes, using a FILL8 operation at step 48. A final OPEN at step 50 removes any large graphics marks that may have survived the previous operations. The size of this OPEN is important in many applications. If the OPEN is done with a small SE (2×2), it may leave large graphics marks; if done with a large SE (4×4), it will also typically remove single lines of text, saving only multiple text lines.

It now remains to expand the filled regions back to the original size, forming a mask for separation of text regions from the rest of the image. FIG. 6 shows details of step 16 of FIG. 1B. In the reduction process, the size of the filled regions was slightly reduced. This can be compensated, for example, by EXPANDing the image at step 52 by a factor of 2 (to SCALE=8), and then using the 3×3 SE shown in FIG. 2A to DILATE the image at step 54. The DILATION by a 3×3 block SE, with center at the center pixel, causes the boundary of each rectangle of ON pixels to be expanded outward by one pixel. The image is now EXPANDed at step 56 by a linear factor of 8, returning to full scale (SCALE=1). This completes the extraction of a text mask. The text mask includes large coalesced regions of ON pixels in regions previously containing text, but will contain few or no ON pixels in line graphics regions. By coalesced regions it is intended to mean herein that regions containing adjacent ON pixels in the original image which were previously interspersed by OFF pixels have been converted such that the adjacent ON pixels are now interspersed by additional ON pixels.

FIG. 7 shows the details of step 18 of FIG. 1B in which two images are created; one for text and one for graphics. The text separation is obtained by ANDing the original image with the text separation mask at step 58. The line graphics separation is then obtained by XORing the original image with the text separation at step 60.

FIG. 8 shows the details of the FILL8 operation shown at step 48. An iterated sequence of erosions and dilations, using two diagonal structuring elements, result in the filling of all 8-connected regions to the smallest possible enclosing rectangles. For every place in the image that matches the pattern of one of the diagonal SEs, the matched pixel is dilated by the other SE, and the result is ORed with the original image. This process is iterated until the image stops changing, as tested by XORing successive iterates and testing for the empty image (no ON pixels).

More specifically, the original image is copied at step 62. After an ERODE at step 64, for every pixel in the image that matches the pattern of the first diagonal SE, the matched pixel is dilated by the second SE at step 66, and the result is ORed with the original image at step 68. This resulting image is copied at step 70 and treated in reverse, i.e., the image is ERODEd at step 72 with the second SE and DILATEd at step 74 with the first SE. At step 76 the result is then ORed with the second copied image. The result is then XORed with the original image at step 78 and the process is repeated until the image stops changing, which occurs when the XOR results in the negative image (i.e., no ON pixels).

D. Illustrative Alternative Embodiment of the Invention

FIG. 9 illustrates an alternative embodiment of the invention in which a seed image is created and filled to a bounding box to create a text mask. The steps shown in FIG. 9 would replace steps 14 and 16 of FIG. 1B in some embodiments and would provide improved noise elimination.

In steps 79 to 81 the image resulting from step 12 is reduced three times using, for example, threshold LEVEL=1. Optionally, the image is thereafter CLOSED at step 82 using, for example, a solid 3×3 SE. The image is then reduced once more at step 83 using a higher threshold level than in the preceding steps, e.g., LEVEL=4. The image is then OPENed with, e.g., a 6×3 SE at step 84 to remove remaining noise resulting in a seed image.

The right hand portion of FIG. 9 illustrates the formation of a mask to which the seed is clipped. The original image is reduced four times at steps 85 to 87 using, for example, threshold LEVEL=1. The image is then DILATED by a small SE (e.g., 2×2), resulting in the formation of a mask to which the seed image is clipped at step 89. The result of fillclip 89 is a separation mask which is used in step 18 to separate the text and line graphics.

FIG. 10 illustrates the fillclip operation 89 in greater detail. In step 90 the seed image is stored. The image is then DILATED at step 91 using, for example, a 3×3 SE. The result of step 92 is then ANDed with the mask image resulting from step 88. The result of the AND is compared to the copied image at step 93 and if the image has not changed from the previous iteration, the filled seed is output as the text mask. If the image is still changing from a previous iteration, the process is repeated using the last iteration in the dilation step 91.

E. Fast Thresholded Reduction (and Expansion) of Images

One requirement of efficient segmentation, is that thresholded reduction must be done quickly. Suppose it is desired to reduce an image by a factor of two in the vertical direction. One way to do this is to use a raster operation (bitbit - bit block transfer) to logically combine the odd and even rows, creating a single row of the reduced image for each pair of rows in the original. The same procedure can then be applied to the columns of the vertically squashed image, giving an image reduced by a factor of two in both directions.

The result, however, depends on the logical operations of the horizontal and vertical raster operations. Obtaining a result with LEVEL=1 or 4 is straightforward. If an OR is used for both raster operation orientations, the result is an ON pixel if any of the four pixels within the corresponding 2×2 square of the original were ON. This is simply a reduction with LEVEL=1. Likewise, if an AND for both raster operation orientations, the result is a reduction with LEVEL=4, where all four pixels must be ON.

A somewhat different approach is used to obtain a reduction with LEVEL=2 or 3. Let the result of doing a horizontal OR followed by a vertical AND be a reduced image R1, and let the result from doing a horizontal AND followed by a vertical OR be a reduced image R2. A reduction with LEVEL=2 is obtained by ORing R1 with R2, and a reduction with LEVEL=3 is obtained by ANDing R1 with R2.

The procedure may not be computationally efficient if implemented as described above. On some computers, such as Sun workstations, raster operations are done in software. The image is stored as a block of sequential data, starting with the first row of the image, moving left-to-right, then the second row, etc. Consequently, the raster operations between rows are fast, because 16 or 32 bits in two words can be combined in one operation. But to perform a raster operation between two columns, the corresponding bits must be found, two bits at a time (one from each column), before the logical operations can be done. It turns out that the time, per pixel, to do the vertical raster operations is at least 25 times greater than the horizontal ones. In fact, when the algorithm is implemented entirely with raster operations, over 90 percent of the time is devoted to the vertical operations.

Fortunately, there is a simple and very fast way to implement the logical operations between columns. Rather than use column raster operations, take 16 sequential bits, corresponding to 16 columns in one row. These 16 bits can be accessed as a short integer. These 16 bits are used as an index into a $2^{16}$-entry array (i.e. a lookup table) of 8-bit objects. The 8-bit contents of the array give the result of ORing the first bit of the index with the second, the third bit with the fourth ... and on to the 15th bit with the 16th. Actually, two arrays are needed, one for ORing the 8 sets of adjacent columns, and one for ANDing the columns. It should be understood that the numerical example is just that, an example. It is also possible to implement this as a $2^8$-entry array of 4-bit objects, or any one of a number of other ways.

The use of lookup tables to implement column logical operations is about as fast, per pixel, as Sun's row raster operations. A 1000×1000 pixel image can be reduced on a Sun 3/260, with either LEVEL=1 or 4, to a 500×500 pixel image in 0.10 second. On a Sun 4/330, the operation takes about 0.04 second.

As discussed above, 2×2 reductions require a first logical operation between rows followed by a second, possibly different, logical operation between columns. Moreover, some threshold levels require two intermediate reduced images which are then combined. The table lookup technique for column operations can become cumbersome if it is desired to have a very wide pixelword. Either the table becomes enormous or one needs special techniques of looking up parts of the wide pixelword in multiple parallel tables. The latter, while clearly superior, does require some way to use portions of the data word as memory addresses, which may not otherwise be necessary.

FIG. 11 is a logic schematic of specialized hardware for performing a logical operation between vertically adjacent 2Q-bit pixelwords and a pairwise bit reduction of the resulting 2Q-bit pixelword (bits 0 through 2Q−1). Although the drawing shows a 16-pixel word, the benefits of this hardware would become manifest for much longer pixelwords where the lookup table technique has become cumbersome. A 512-bit pixelword is contemplated, since a line of image would represent only a few pixelwords.

The reduction of the two pixelwords occurs in two stages, designated 200 and 202. In the first stage, a vertically adjacent pair of pixelwords is read from a first memory 203, and the desired first logical operation is carried out between them. The desired second logical operation is then carried out between the resulting pixelword and a version of the pixelword that is shifted by one bit. This provides a processed pixelword having the bits of interest (valid bits) in every other bit position. In the second stage, the valid bits in the processed pixelword are extracted and compressed, and the result stored in a second memory 204. Memory 203 is preferably organized with a word size corresponding to the pixelword size. Memory 204 may be organized the same way.

The preferred implementation for stage 200 is an array of bit-slice processors, such as the IDT 49C402 processor, available from Integrated Device Technology. This specific processor is a 16-bit wide device, each containing 64 shiftable registers. Thirty-two such devices would be suitable for a 512-bit pixelword. For simplification, a 16-bit system with four registers 205, 206, 207, and 208 is shown. Among the processor's operations are those that logically combine the contents of first and second registers, and store the result in the first. The processor has a data port 215, which is coupled to a data bus 217.

Second stage 202 includes first and second latched transceivers 220 and 222, each half as wide as the pixelword. Each transceiver has two ports, designated 220a and 220b for transceiver 220 and 222a and 222b for transceiver 222. Each transceiver is half as wide as the pixelword. Ports 220a and 222a are each coupled to the odd bits of data bus 217, which correspond to the bits of interest. Port 220b is coupled to bits 0 through (Q−1) of the data bus, while port 222b is coupled to bits Q through (2Q−1). The bus lines are pulled up by resistors 125 so that undriven lines are pulled high.

Consider the case of a 2×2 reduction with LEVEL=2. The sequence of operations requires that (a) a vertically adjacent pair of pixelwords be ANDed to form a (single 2Q-bit pixelword, adjacent pairs of bits be ORed to form a Q-bit pixelword, and the result be stored; (b) the vertically adjacent pair of pixelwords be ORed, adjacent bits of the resultant 2Q-bit pixelword be ANDed, and the resultant Q-bit pixelword be stored; and (c) the two Q-bit pixelwords be ORed.

To effect this, a pair of vertically adjacent pixelwords are read from first memory 203 onto data bus 217 and into registers 205 and 206. Registers 205 and 206 are ANDed and the result stored in registers 207 and 208. The content of register 208 is shifted one bit to the right, registers 207 and 208 are ORed, and the result is stored in register 208. Registers 205 and 206 are ORed, and the result stored in registers 206 and 207. The content of register 207 is right shifted by one bit, registers 206 and 207 are ANDed, and the result stored in register 207.

At this point, register 207 contains the result of ORing the two pixelwords and ANDing pairs of adjacent bits, while register 208 contains the result of ANDing the pixelwords and ORing pairs of adjacent bits. However, registers 207 and 208 contain the valid bits in the odd bit positions 1, 3, . . . (2Q−1). For a reduction with LEVEL=2, registers 207 and 208 are ORed and the result is made available at processor data port 215 which is coupled to data bus 217.

The odd bits of the data bus are latched into transceiver 220 through port 220a, resulting in a Q-bit pixelword with the valid bits in adjacent positions. Although this Q-bit entity could be read back onto the bus and transferred to memory 204, it is preferable to use both latches. Thus, two new pixelwords (horizontally adjacent to the first two) are processed at stage 200 as described above, the result is made available at processor data port 215, and is latched into transceiver 222 through port 222a. The contents of the two transceivers are then read out through ports 220b and 222b onto data bus 217 in order to provide a 2Q-bit pixelword that represents the reduction of four 2Q-bit pixelwords. The result is transferred to second memory 204. This overall sequence continues until all the pixelwords in the pair of rows has been processed. Once the pair of rows has been processed, subsequent pairs are similarly processed.

As mentioned above each bit-slice processor has 64 registers. Accordingly, since memory accesses are more efficient in a block mode, faster operation is likely to result if 8 pairs of pixelwords are read from memory 203 in a block, processed as discussed above, stored in the processor's registers, and written to memory 204 in a block.

Image enlargement is similar, but the steps are executed in the reverse order. First, the processor reads a pixelword and sends the left half through port 220b of transceiver 220. This is read onto the bus through port 220a. Only every other pixel in the resulting word on the bus will initially be valid, so the processor will need to validate all the pixels using a sequence of shifts and logic operations. Since resistors 225 pull up all the bus lines that are not driven, each undriven line, all the even bits in this case, will be 1's. This expanded pixelword, which alternates 1's with valid data, is read into two registers, the content of one register is shifted one place, and the registers are logically ANDed. Everywhere there was a 0 in an odd bit, there will be 00 in an even/odd pair. None of the other bits will be affected. This pixelword is then written to two vertically adjacent words in the expanded image. This process is repeated for the right half of the pixelword using the transceiver 222. The processor expands the entire row one pixelword at a time and the entire image one row at a time.

F. Discussion of the Software

Microfiches 1 (®Unpublished Work, Xerox Corporation) provides a source code program for implementation of one embodiment of the invention provided herein. The program is in the "C" language, well known to those of skill in the art. The program has been demonstrated on Sun 3 and 4 workstations, although it will be apparent to those of skill in the art that a wide variety of programming languages and hardware configurations could readily be used based on this disclosure without departing from the scope of the invention. Further, while the invention is illustrated herein primarily with regard to implementations in a programmed digital computer, other implementations will be immediately apparent. For example, the invention could be implemented in other digital processing systems such as one formed from discrete hardware components, or a combination of hardware and software components.

G. Graphical Illustration of the Invention

FIGS. 12A to 12D illustrate operation of one embodiment of the invention. FIG. 12A illustrates an original image at full scale. The image contains text and line graphics and the line graphics contain minor amounts of text associated therewith.

FIG. 12B illustrates the text mask resulting from step 14 of the invention. It is seen that the mask defines only the text regions. FIG. 12C illustrates the resulting text image from the separation step 18. It is seen that all of the line graphics and its associated text have been removed but that all of the text blocks remain. Conversely, in FIG. 12D it is seen that all of the text blocks have been removed, but that the line graphics and its associated labels remain.

FIGS. 13A and 13B illustrate operation of the invention on the same image, but at a reduced scale of 16×. Individual pixels of the image can be observed. In particular, FIG. 13A is the image shown in FIG. 12A after a series of reductions resulting in a total of a 16x reduction. FIG. 13B illustrates the text mask resulting from the process. Expansion of the mask and an AND with the original image result in the same separation illustrated in FIG. 12.

H. Conclusion

The present invention provides a significantly improved method and apparatus for identifying text and line graphics in an image. It is to be understood that the above description is intended to be illustrative and not restrictive. Many variations of the invention will become apparent to those of skill in the art upon review of this disclosure. The above alternative methods of conducting the method are illustrative of the variations which could be implemented by those of skill in the art. The scope of the invention should, therefore, be determined not with reference to the above description, but instead should be determined with reference to the appended claims along with their full scope of equivalents.

What is claimed is:

1. In a digital processing system, a method of identifying a line graphics region in an image containing at least text and line graphics, comprising the steps of:
   a) converting OFF pixels adjacent text pixels to ON pixels using a structure element having a higher probability of having a hit in said text than said line graphics, at least a portion of said ON pixels connecting adjacent text pixels so as to produce coalesced regions of ON pixels; and
   b) identifying at least a portion of said image having said coalesced regions of ON pixels, at least a portion of a remainder of said image comprising said line graphics region, said step of identifying comprising the steps of:
      i) forming a mask, the mask comprising ON pixels in a region of text pixels, said step of forming a mask comprising the steps of substantially eliminating at least a portion of vertical lines from said image containing text and line graphics to produce a first intermediate image, and turning on additional pixels adjacent to remaining ON pixels in said first intermediate image; and
      ii) forming a graphics image, said graphics image comprising a region of said image containing text and line graphics outside of said mask.

2. The method as recited in claim 1 wherein the step of eliminating vertical lines from said first intermediate image further comprises the steps of:
   a) closing said image containing text and line graphics with a structuring element having at least two adjacent horizontal ON pixels; and
   b) opening said image with a structuring element having at least two adjacent horizontal ON pixels to produce said first intermediate image.

3. The method as recited in claim 2 wherein the structuring element used in said step of opening uses a structuring element having at least three adjacent horizontal ON pixels.

4. The method as recited in claim 3 wherein said closing step uses a structuring element with at least three adjacent horizontal ON pixels and said step of opening uses a structuring element having at least four adjacent horizontal ON pixels.

5. The method as recited on claim 2 preceded by the step of at least one reduction of said image containing text and line graphics.

6. The method as recited in claim 2 preceded by the step of at least two reductions of said image containing text and line graphics.

7. The method as recited in claim 1 wherein the step of turning on additional pixels is a step of turning pixels ON within a bounding box.

8. The method as recited in claim 7 wherein the step of tuning on additional pixels is a step of iteratively eroding and dilating said first intermediate image with a structuring element having at least two adjacent diagonal ON pixels to produce a filled image until said filled image does not substantially change.

9. The method as recited in claim 7 wherein the step of turning on additional pixels is preceded by an additional reduction step.

10. The method as recited in claim 7 wherein the step of turning on additional pixels is preceded by a closing step, said closing step using a structuring element (SE) having at least three adjacent vertical ON pixels.

11. The method as recited in claim 7 wherein the step of turning on additional pixels is followed by an opening step, said open using at least a 2×2 structuring element (SE) of solid ON pixels.

12. The method as recited in claim 7 followed by the step of expanding said mask by a factor of at least two.

13. The method as recited in claim 7 followed by the step of dilating said mask.

14. The method as recited in claim 7 followed by the step of:
   a) expanding said mask by a factor of at least two then;
   b) dilating said mask then;
   c) again expanding said mask by a factor of at least two.

15. In a digital processing system, a method of identifying a line graphics region in an image containing at least text and line graphics, comprising the steps of:
   a) converting OFF pixels adjacent text pixels to ON pixels using a structuring element having a higher probability of having a hit in said text than said line graphics, at least a portion of said ON pixels connecting adjacent text pixels so as to produce coalesced regions of ON pixels; and
   b) identifying at least a portion of said image having said coalesced regions of ON pixels, at least a portion of a remainder of said image comprising said line graphics region, said step of identifying comprising the steps of:
      i) forming a mask, the mask comprising ON pixels in a region of text pixels, said step of forming a mask comprising the steps of substantially eliminating at least a portion of the horizontal lines from said image containing text and line graphics to produce a first intermediate image, and turning on additional pixels adjacent to remaining ON pixels in said first intermediate image; and
      ii) forming a graphics image, said graphics image comprising a region of said image containing text and line graphics outside of said mask.

16. The method as recited in claim 15 wherein the step of substantially eliminating horizontal lines from said image comprising the step of opening said image containing text and line graphics with a structuring element having at least two adjacent vertical ON pixels.

17. The method as recited in claim 15 wherein the step of substantially eliminating horizontal lines from said image comprises the steps of:
   a) closing said image containing text and line graphics, said step of closing using a structuring element having at least two adjacent vertical ON pixels; and
   b) opening said image, said step of opening using a structuring element having at least two adjacent vertical ON pixels to produce said first intermediate image.

18. The method as recited in claim 16 preceded by the steps of:
   a) reducing said image containing text and line graphics to produce a reduced image; and
   b) closing said reduced image with a structuring element having at least five horizontal ON pixels.

19. The method as recited in claim 17 preceded by the steps of:
   a) reducing said image containing text and line graphics to produce a reduced image; and
   b) closing said reduced image with a structuring element having at least five horizontal ON pixels.

20. A digital computer system programmed to identify a line graphics region in an image containing at least test and line graphics, said digital computer system programmed to:
   a) convert OFF pixels adjacent text pixels to ON pixels using a structuring element having a higher probability of having a hit in said text than said line graphics, at least a portion of said ON pixels connecting adjacent text pixels so as to produce coalesced regions of ON pixels; and
   b) identify at least a portion of said image having said coalesced regions of ON pixels, at least a portion of a remainder of said image comprising said line graphics region, said identifying comprising:
      i) forming a mask, said mask comprising ON pixels in a region of text pixels, by substantially eliminating at least a portion of vertical lines from said image containing text and line graphics to produce a first intermediate image, and turning on additional pixels adjacent to remaining ON pixels in said first intermediate image; and
      ii) forming a graphics image, said graphics image comprising a region of said image containing text and line graphics outside of said mask.

21. The computer system as recited in claim 20 programmed to eliminate vertical lines from said first intermediate image by:
   a) closing said image containing text and line graphics with a structuring element having at least two adjacent horizontal ON pixels; and
   b) opening said image with a structuring element having at least two adjacent horizontal ON pixels to produce said first intermediate image.

22. The computer system as recited in claim 21 wherein the structuring element used to open has at least three adjacent horizontal ON pixels.

23. The computer system as recited in claim 21 wherein the structuring element used to close has at least three adjacent horizontal ON pixels and the structuring element used to open has at least one more adjacent horizontal ON pixel than said structuring element used to close.

24. The computer system as recited in claim 21 further programmed to perform at least one reduction of said image containing text and line graphics.

25. The computer system as recited in claim 21 further programmed to perform at least two reductions of said image containing text and line graphics.

26. The computer system as recited in claim 20 programmed to turn on additional pixels by turning pixels on up to a bounding box.

27. The computer system as recited in claim 26 programmed to turn on additional pixels by iteratively eroding and dilating said first intermediate image with a structuring element having at least two adjacent diagonal ON pixels to produce a filled image until said filled image does not substantially change.

28. The computer system as recited in claim 26 further programmed to perform an additional reduction before turning on additional pixels.

29. The computer system as recited in claim 26 further programmed to perform a closing step, said closing step using a structuring element (SE) having at least three adjacent vertical ON pixels.

30. The computer system as recited in claim 26 further programmed to perform an opening step, said opening using at least a 2×2 structuring element (SE) of solid ON pixels.

31. The computer system as recited in claim 26 further programmed to expand said mask by a factor of at least two.

32. The computer system as recited in claim 26 further programmed to dilate said mask.

33. The computer system as recited in claim 26 further programmed to:
   a) expand said mask then by a factor of at least two;

b) dilate said mask then;

c) again expand said mask by a factor of at least two.

34. A digital computer system programmed to identify a line graphics region in an image containing at least text and line graphics, said digital computer system programmed to:
- a) convert OFF pixels adjacent text pixels to ON pixels using a structuring element having a higher probability of having a hit in said text than said line graphics, at least a portion of said ON pixels connecting adjacent text pixels so as to produce coalesced regions of ON pixels; and
- b) identify at least a portion of said image having said coalesced regions of ON pixels, at least a portion of a remainder of said image comprising said line graphics region, said identifying comprising:
  - i) forming a mask, said mask comprising ON pixels in a region of text pixels, by substantially eliminating at least a portion of horizontal lines from said image containing text and line graphics to produce a first intermediate image, and turning on additional pixels adjacent to remaining ON pixels in said first intermediate image; and
  - ii) forming a graphics image, said graphics image comprising a region of said image containing text and line graphics outside of said mask.

35. The computer system as recited in claim 34 programmed to substantially eliminate horizontal lines from said image by opening said image containing text and line graphics with a structuring element having at least two adjacent vertical ON pixels.

36. The computer system as recited in claim 34 programmed to substantially eliminate horizontal lines from said image by:
- a) closing said image containing text and line graphics, said step of closing using a structuring element having at least two adjacent vertical ON pixels; and
- b) opening said image, said step of opening using a structuring element having at least two adjacent vertical ON pixels to produce said first intermediate image.

37. The computer system as recited in claim 35 further programmed to process the image by:
- a) reducing said image containing text and line graphics to produce a reduced image; and
- b) closing said reduced image with a structuring element having at least five horizontal ON pixels.

38. The computer system as recited in claim 36 further programmed to process the image by:
- a) reducing said image containing text and line graphics to produce a reduced image; and
- b) closing said reduced image with a structuring element having at least five horizontal ON pixels.

39. In a digital processing system, a method of identifying a line graphics region in an image containing at least text and line graphics, comprising the steps of converting OFF pixels adjacent text pixels to ON pixels, at least a portion of said ON pixels connecting adjacent text pixels so as to produce coalesced regions of ON pixels, and identifying at least a portion of said image having said coalesced regions of ON pixels, at least a portion of a remainder of said image comprising said line graphics region, said steps of converting and identifying further comprising the steps of:
- a) forming a mask, said mask comprising ON pixels in a region of text pixels, the step of forming a mask further comprising the steps of:
  - i) substantially eliminating at least a portion of vertical lines from said image containing text and line graphics to produce a first intermediate image; and
  - ii) turning on additional pixels adjacent to remaining ON pixels in said first intermediate image wherein the step of turning on additional pixels is a step of turning pixels on within a bounding box, by iteratively eroding and dilating said first intermediate image with a structuring element having at least two adjacent diagonal ON pixels to produce a filled image until said filled image does not substantially change, said step of iteratively eroding and dilating comprising the steps of: eroding said first intermediate image with a structuring element (SE) having ON pixels along a first diagonal to produce a second intermediate image; dilating said second intermediate image with a SE having ON pixels along a second diagonal to produce a third intermediate image; ORing said third intermediate image with said first intermediate image to produce a forth intermediate image; eroding said fourth intermediate image with said second SE to produce a fifth intermediate image; dilating said fifth intermediate image with said first SE to produce a sixth intermediate image; ORing said sixth intermediate image with said fourth intermediate image to produce a seventh intermediate image; and returning to said eroding step using said seventh intermediate image as said first intermediate image until said first intermediate image and said seventh intermediate image do not substantially differ; and
- b) forming a graphics image, said graphics image comprising a region of said image containing text and line graphics.outside of said mask.

40. In a digital processing system, a method of identifying a text region in an image containing at least text and line graphics, comprising the steps of converting OFF pixels adjacent text pixels to ON pixels, at least a portion of said ON pixels connecting adjacent text pixels so as to produce coalesced regions of ON pixels, and identifying at least a portion of said image having said coalesced regions of ON pixels, said at least a portion comprising said text region, the steps of converting and identifying further comprising the steps of:
- a) forming a mask, said mask comprising ON pixels in a region of text pixels, the step of forming a mask further comprising the steps of:
  - i) substantially eliminating at least a portion of vertical lines from said image containing text and line graphics to produce a first intermediate image; and
  - ii) turning on additional pixels adjacent to remaining ON pixels in said first intermediate image, wherein the step of turning on additional pixels is a step of turning pixels on within a bounding box, by iteratively eroding and dilating said first intermediate image with a structuring element having at least two adjacent diagonal ON pixels to produce a filled image until said filled image does not substantially change, said step of iteratively eroding and dilating comprising the steps of: eroding said first intermediate image with a structuring element (SE) having ON pixels along a first diagonal to produce a second intermediate image; dilating said second intermediate image with an SE having ON pixels along a second diagonal to produce a third intermediate image; ORing said third intermediate image with said first intermediate image to produce a fourth intermediate image; eroding said fourth intermediate image with said second SE to produce a fifth intermediate image; dilating said fifth intermediate image with said first SE to produce a sixth intermediate image; ORing said sixth intermediate image with said fourth intermediate image to produce a seventh intermediate image; and returning to said eroding step using said seventh intermediate image as said first intermediate image until said first intermediate image and said seventh intermediate image do not substantially differ; and b) forming a text image, said text image comprising a region of said image containing text and line graphics within said mask.

41. A computer programmed to perform the method of claims 39 or 40.

42. In a digital processing system, a method of identifying a text region in an image containing at least text and line graphics, comprising the steps of:
a) converting OFF pixels adjacent text pixels to ON pixels using a structuring element having a higher probability of having a hit in said text then said line graphics, at least a portion of said ON pixels connecting adjacent text pixels so as to produce coalesced regions of ON pixels; and
b) identifying at least a portion of said image having said coalesced regions of ON pixels, said at least a portion comprising said text region, the step of identifying further comprising the steps of:
i) forming a mask, said mask comprising ON pixels in a region of text pixels, said step of forming a mask comprising the steps of substantially eliminating at least a portion of vertical lines from said image containing text and line graphics to produce a first intermediate image, and turning on additional pixels adjacent to remaining ON pixels in said first intermediate image; and
ii) forming a text image, said text image comprising a region of said image containing text and line graphics within said mask.

43. The method as recited in claim 42 wherein the step of eliminating vertical lines from said first intermediate image further comprising the steps of:
a) closing said image containing text and line graphics with a structuring element having at least two adjacent horizontal ON pixels; and
b) opening said image with a structuring element having at least two adjacent horizontal ON pixels to produce said first intermediate image.

44. The method as recited in claim 43 wherein the structuring element used in said step of opening uses a structuring element having at least three adjacent horizontal ON pixels.

45. The method as recited in claim 44 wherein said closing step uses a structuring element with at least three adjacent horizontal ON pixels and said step of opening uses a structuring element having at least four adjacent horizontal ON pixels.

46. The method as recited in claim 43 preceded by the step of at least one reduction of said image containing text and line graphics.

47. The method as recited in claim 43 preceded by the step of at least two reductions of said image containing text and line graphics.

48. The method as recited in claim 42 wherein the step of turning on additional pixels is a step of turning pixels ON within a bounding box.

49. The method as recited in claim 48 wherein the step of turning on additional pixels is a step of iteratively eroding and dilating said first intermediate image with a structuring element having at least two adjacent diagonal ON pixels to produce a filled image until said filled image does not substantially change.

50. The method as recited in claim 48 wherein the step of turning on additional pixels is preceded by an additional reduction step.

51. The method as recited in claim 48 wherein the step of turning on additional pixels is preceded by a closing step, said closing step using a structuring element (SE) having at least three adjacent vertical ON pixels.

52. The method as recited in claim 48 wherein the step of turning on additional pixels is followed by an opening step, said open using at least a 2×2 structuring element (SE) of solid ON pixels.

53. The method as recited in claim 48 followed by the step of expanding said mask by a factor of at least two.

54. The method as recited in claim 48 followed by the step of dilating said mask.

55. The method as recited in claim 48 followed by the steps of:
a( expanding said mask by a factor of at least two then;
b) dilating said mask then;
c) again expanding said mask b a factor of at least two.

56. In a digital processing system, a method of identifying a text region in an image containing at least text and line graphics, comprising the steps of:
a) converting OFF pixels adjacent text pixels to ON pixels using a structuring element having a higher probability of having a hit in said text than said line graphics, at least a portion of said ON pixels connecting adjacent text pixels so as to produce coalesced regions of ON pixels; and
b) identifying at least a portion of said image having said coalesced regions of ON pixels, said at least a portion comprising said text region, the step of identifying further comprising the steps of:
i) forming a mask, said mask comprising ON pixels in a region of text pixels, said step of forming a mask comprising the steps of substantially eliminating at least a portion of the horizontal lines from said image containing text and line graphics to produce a first intermediate image, and turning on additional pixels adjacent to remaining ON pixels in said first intermediate image; and
ii) forming a text image, said text image comprising a region of said image containing text and line graphics within said mask.

57. The method as recited in claim 56 wherein the step of substantially eliminating horizontal lines from said image comprises the step of opening said image containing text and line graphics with a structuring element having at least two adjacent vertical ON pixels.

58. The method as recited in claim 56 wherein the step of substantially eliminating horizontal lines from said image comprises the steps of:

a) closing said image containing text and line graphics, said step of closing using a structuring element having at least two adjacent vertical ON pixels; and b) opening said image, said step of opening using a structuring element having at least two adjacent vertical ON pixels to produce said first intermediate image.

59. The method as recited in claim 57 preceded by the steps of:

a) reducing said image containing text and line graphics to produce a reduced image; and b) closing said reduced image with a structuring element having at least five horizontal ON pixels.

60. The method as recited in claim 58 preceded by the steps of:

a) reducing said image containing text and line graphics to produce a reduced image; and b) closing said reduced image with a structuring element having at least five horizontal ON pixels.

61. A digital computer system programmed to identify a text region in an image containing at least text and line graphics, said digital computer system programmed to:

a) convert OFF pixels adjacent text pixels to ON pixels using a structuring element having a higher probability of having a hit in said text than said line graphics, at least a portion of said ON pixels connecting adjacent text pixels so as to produce coalesced regions of ON pixels; and b) identify at least a portion of said image having said coalesced regions of ON pixels, said at least a portion comprising said text region, said identifying comprising:

i) forming a mask, said mask comprising ON pixels in a region of text pixels, by substantially eliminating at least a portion of vertical lines from said image containing text and line graphics to produce a first intermediate image, and turning on additional pixels adjacent to remaining ON pixels in said first intermediate image; and ii) forming a text image, said text image comprising a region of said image containing text and line graphics within said mask.

62. The computer system as recited in claim 61 programmed to eliminate vertical lines from said first intermediate image by:

a) closing said image containing text and line graphics with a structuring element having at least two adjacent horizontal ON pixels; and b) opening said image with a structuring element having at least two adjacent horizontal ON pixels to produce said first intermediate image.

63. The computer system as recited in claim 62 wherein the structuring element used to open has at least three adjacent horizontal ON pixels.

64. The computer system as recited in claim 62 wherein the structuring element used to close has at least three adjacent horizontal ON pixels and the structuring element used to open has at least one more adjacent horizontal ON pixel than said structuring element used to close.

65. The computer system as recited in claim 62 further programmed to perform at least one reduction of said image containing text and line graphics.

66. The computer system as recited in claim 62 further programmed to perform at least two reductions of said image containing text and line graphics.

67. The computer system as recited in claim 61 programmed to turn on additional pixels by turning pixels on up to a bounding box.

68. The computer system as recited in claim 67 programmed to turn on additional pixels by iteratively eroding and dilating said first intermediate image with a structuring element having at least two adjacent diagonal ON pixels to produce a filled image until said filled image does not substantially change.

69. The computer system as recited in claim 67 further programmed to perform an additional reduction before turning on additional pixels.

70. The computer system as recited in claim 67 further programmed to perform a closing step, said closing step using a structuring element (SE) having at least three adjacent vertical ON pixels.

71. The computer system as recited in claim 67 further programmed to perform an opening step, said open using at least a 2×2 structuring element (SE) of solid ON pixels.

72. The computer system as recited in claim 67 further programmed to expand said mask by a factor of at least two.

73. The computer system as recited in claim 67 further programmed to dilate said mask.

74. The computer system as recited in claim 67 further programmed to:

a) expand said mask then by a factor of at least two;

b) dilate said mask then;

c) again expand said mask by a factor of at least two.

75. A digital computer system programmed to identify a line graphics region in an image containing at least text and line graphics, said digital computer system programmed to:

a) convert OFF pixels adjacent text pixels to ON pixels using a structuring element having a higher probability of having a hit in said text than said line graphics, at least a portion of said ON pixels connecting adjacent text pixels so as to produce coalesced regions of ON pixels; and b) identify at least a portion of said image having said coalesced regions of ON pixels, at least a portion of a remainder of said image comprising said line graphics region, said identifying comprising:

i) forming a mask, said mask comprising ON pixels in a region of text pixels, by substantially eliminating at least a portion of horizontal lines from said image containing text and line graphics to produce a first intermediate image, and turning on additional pixels adjacent to remaining ON pixels in said first intermediate image; and ii) forming a graphics image, said graphics image comprising a region of said image containing text and line graphics outside of said mask.

76. The computer system as recited in claim 75 programmed to substantially eliminate horizontal lines from said image by opening said image containing text and line graphics with a structuring element having at least two adjacent vertical ON pixels.

77. The computer system as recited in claim 75 programmed to substantially eliminate horizontal lines from said image by:

a) closing said image containing text and line graphics, said step of closing using a structuring element having at least two adjacent vertical ON pixels; and b) opening said image, said step of opening using a structuring element having at least two adjacent vertical ON pixels to produce said first intermediate image.

78. The computer system as recited in claim 76 further programmed to process the image by:
a) reducing said image containing text and line graphics to produce a reduced image; and
b) closing said reduced image with a structuring element having at least five horizontal ON pixels.

79. The computer system as recited in claim 77 further programmed to process the image by:
a) reducing said image containing text and line graphics to produce a reduced image; and
b) closing said reduced image with a structuring element having at least five horizontal ON pixels.

* * * * *